June 10, 1930. T. H. FOSTER 1,763,296
AWNING FRAME STRUCTURE
Filed March 23, 1927 2 Sheets-Sheet 2
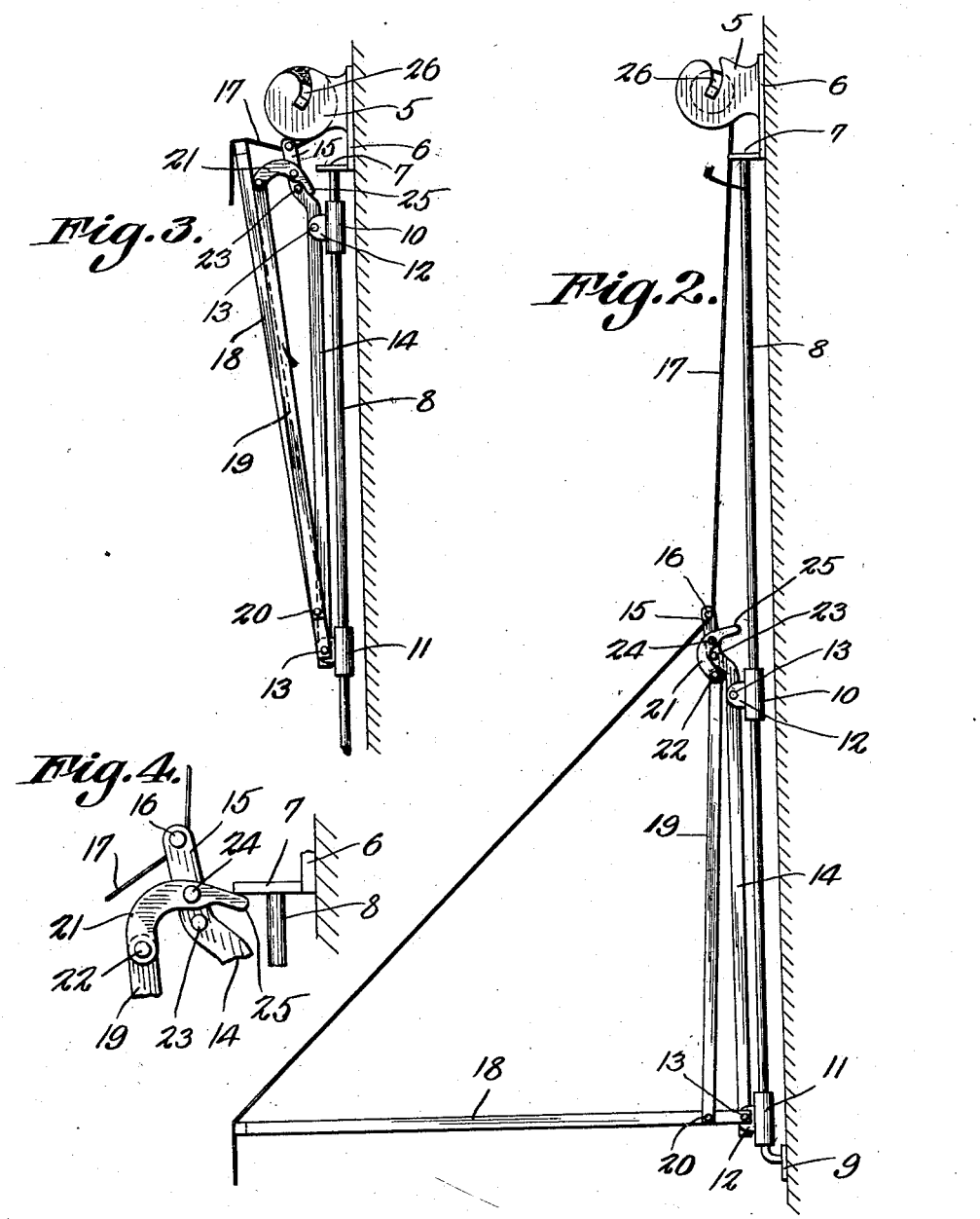
Inventor
Thomas H. Foster
By CA Snow & Co.
Attorneys.

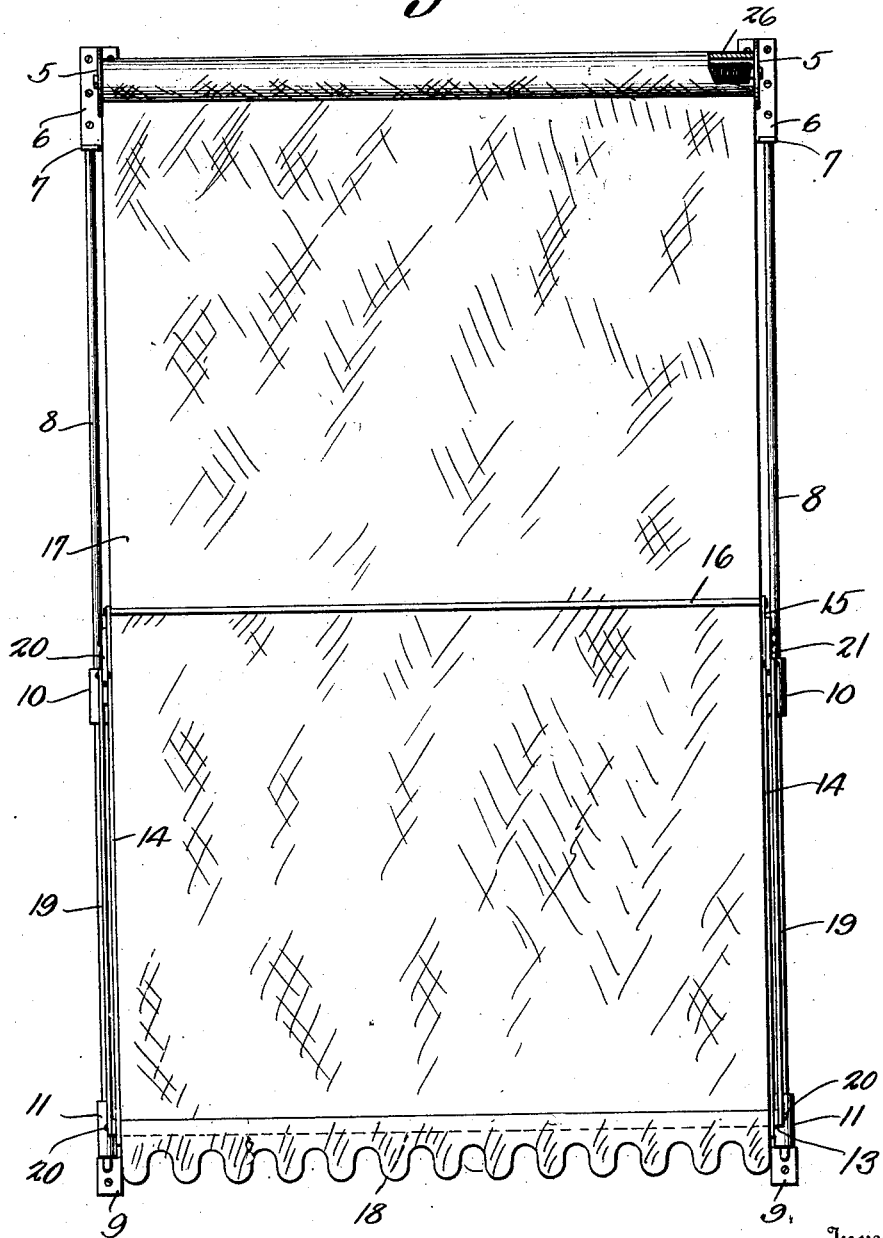

Patented June 10, 1930

1,763,296

UNITED STATES PATENT OFFICE

THOMAS HAROLD FOSTER, OF TOPEKA, KANSAS, ASSIGNOR TO TOPEKA TENT & AWNING CO., OF TOPEKA, KANSAS, A CORPORATION OF KANSAS

AWNING-FRAME STRUCTURE

Application filed March 23, 1927. Serial No. 177,826.

The present invention has reference to awnings and awning frame constructions, the primary object of the invention being to provide an awning frame which when moved to its active or extended position will be locked and held in such position against movement under wind pressure.

An important object of the invention is to provide an awning construction which when moved to fold the same to its inactive position, will automatically assume a position in proximity to the window frame to which the awning is secured.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a front elevational view of an awning and frame constructed in accordance with the invention.

Figure 2 is a side elevational view thereof.

Figure 3 is a side elevational view illustrating the awning in its folded position.

Figure 4 is an enlarged detail view illustrating the means for breaking the locking frame structure.

Referring to the drawings in detail, the awning embodies supporting brackets 5 arranged on opposite sides of a window frame adjacent to the top thereof, and as shown, each of these brackets embodies a base 6 formed with openings to receive securing screws so that the brackets may be firmly secured to the window frame.

Extending forwardly from each bracket is an ear 7 defining a stop to which the upper ends of the lateral supporting rods 8 are secured, the lower ends of the rods 8 extending inwardly and provided with plates 9 whereby they may be secured at their lower ends, it being understood that these rods 8 are of lengths to reach from the upper portion of the window to points adjacent to the lower edge of the window.

Mounted for sliding movement on these rods 8 are bearings 10 and 11 respectively, which bearings have forwardly extended ears 12 provided with openings to receive the pivot pins 13 that pivotally connect the U-shaped awning frame 14 to the bearings.

This awning frame 14 has forwardly and upwardly extended upper end portions 15 located at opposite sides of the frame, which end portions are connected by means of the rod 16.

The awning proper 17, which is formed preferably of canvas, passes under the rod 16 in a manner as shown by Figure 2 of the drawings.

The awning 17 is secured to the substantially U-shaped visor frame 18, as clearly shown by Figure 2, the frame 18 embodying side bars that are pivotally connected to the bearings 11, to the end that when the bearings 11 are moved downward, the visor frame may be extended in a manner as shown by Figure 2 to hold the lower end of the awning in spaced relation with the window.

The visor frame 18 is locked in its extended position by means of the vertical bars 19 that are pivotally connected to the frame 18 at 20, the upper ends of the bars 19 being pivotally connected to the curved arms 21 at 22. Pins 23 extend outwardly from the awning frame 14 and lie in the paths of travel of the arms 21 when they are moved in one direction, to limit movement of the arms, it being understood that these arms 21 are pivotally connected to the awning frame 14 at 24. Forming a part of the arms 21 are extensions 25 which contact with the stops 7, when the awning is elevated to the limit of its upward movement, to swing the lower ends of the arms 21 outwardly and allowing the bars 19 to move upwardly, releasing the frame 18 to allow the awning to be rolled on the awning roll 26, which is of the spring type and which is supported within the brackets 5.

From the foregoing it will be obvious that when the awning is in a position as shown by Figure 3, it is only necessary to swing the visor frame 18 downwardly and slide the awning downwardly on the rods 8, until the bars 19 assume positions as shown by Figure 2, whereupon the visor frame is locked in its extended position.

In order to close the awning, it is only necessary to elevate the bearings 10 and 11 to bring the extensions 25 into engagement with the stops 7 that are shown as extending beyond the rods 8, whereupon these arms 21 are tripped with the result that the visor frame 18 will move upwardly under the tension of the spring roller or spool roller on which the awning is rolled.

I claim:

1. In a roller awning, guides, stops on the guides, a U-shaped awning frame, upper and lower bearings slidably mounted on the guides and to which the awning frame is pivotally connected, a visor frame pivotally connected with the lower bearings, vertical bars pivotally connected to the visor frame, curved arms having extensions, pivotally connected to the vertical bars and having pivotal connection with the awning frame, said extensions adapted to engage the stops when the awning is moved longitudinally of the guides, a predetermined distance, to move the vertical bars outwardly at their upper ends and cause the visor frame to swing upwardly, and a fabric having one of its ends secured to the visor frame, the opposite end of the fabric being secured to the roller to hold the fabric taut.

2. In a roller awning, guides, vertically movable upper and lower bearings on the guides, a U-shaped awning frame secured to the bearings, a U-shaped visor frame pivotally connected to the lower bearings, bars having their lower ends pivotally connected to the visor frame at points in spaced relation with the pivoted ends of the visor frame, arms pivotally connected with the awning frame and having pivotal connection with the bars, means in the path of travel of the arms for engaging the arms to move the arms and swing the upper ends of the bars outwardly to permit the visor frame to swing upwardly, and a fabric having one of its ends secured to the visor frame and the opposite end secured to the roller to hold the fabric taut.

3. In a roller awning, guides, upper and lower bearings slidable on the guides, an awning frame secured to the bearings, a visor frame pivotally connected with the lower bearings, vertical bars pivotally connected to the visor frame, pivoted members connected with the bars adjacent to their upper ends and adapted to move to hold the bars in vertical positions when the awning is open, means in the path of upward travel of the pivoted members for operating the pivoted members to move the upper ends of the bars outwardly to permit the visor frame to swing upwardly, and a fabric having one of its ends secured to the visor frame, the opposite end of the fabric being connected to the roller to hold the fabric taut.

4. In a roller awning, guides, stops on the guides, a U-shaped awning frame, upper and lower bearings slidably mounted on the guides and to which the awning frame is connected, a visor frame pivotally connected with the lower bearings, vertical bars pivotally connected to the visor frame, curved arms having extensions, pivotally connected to the vertical bars and having pivotal connection with the awning frame, said extensions adapted to engage the stops when the awning is moved longitudinally of the guides a predetermined distance, to move the vertical bars outwardly at their upper ends and cause the visor frame to swing upwardly, and a fabric having one of its ends secured to the visor frame, the opposite end of the fabric being secured to the roller to hold the fabric taut.

5. In an awning, a support, an inverted U-shaped frame slidingly mounted on said support, an awning frame pivoted to said U-shaped frame, a brace between said U-shaped frame and the awning frame, and means to trip said brace when the U-shaped frame has reached a predetermined point in its upward travel on said support.

6. In an awning frame, a support, an inverted U-shaped frame slidingly mounted on said support, an awning frame pivoted to said U-shaped frame, a brace between said U-shaped frame and the awning frame, and a lever pivoted intermediate its ends and adapted to trip said brace when the U-shaped frame has reached a predetermined point in its upward travel.

7. In an awning, a support, an awning frame for sliding on said support, a visor frame pivoted to said awning frame, means comprising an upper and a lower member for locking the visor frame against collapse until the awning frame has reached a predetermined point in its upward travel, and stop means for limiting movement of the locking means in one direction.

8. In an awning, a support, an awning frame for sliding on said support, a visor frame pivoted to said awning frame, means for locking the visor frame against collapse until the awning frame has reached a predetermined point in its upward travel, said means comprising a member pivoted to the awning frame and a second member pivoted to the visor frame, and stop means for limiting movement of said pair of members in one direction.

9. In a roller awning provided with guides having ears at their upper ends, a frame embodying bars slidably mounted on the guides, a U-frame pivotally supported on the bars adjacent the lower ends thereof, vertical bars pivotally connected with the U-frame, arms having tail pieces and pivotally connected with the vertical bars, said tail pieces being constructed to engage the ears to move the vertical bars outwardly to allow the U-frame to swing upwardly, and a fabric secured to the frame to move therewith.

10. In a roller awning provided with guides, a frame mounted for sliding movement on the guides, said frame including a pivotally supported U-frame, bars for normally securing the U-frame in an extended position, pivoted members mounted on the bars for moving the bars to their inactive positions, means in the path of travel of the pivoted members for moving the pivoted members to allow the U-frame to swing upwardly, and a strip of fabric material secured to the U-frame.

In testimony that I claim the foregoing as my own, I have hereto affixed my signature.

THOMAS HAROLD FOSTER.